UNITED STATES PATENT OFFICE.

CARL STEFFEN, OF VIENNA, AUSTRIA-HUNGARY.

METHOD OF EXTRACTING SUGAR-JUICES.

1,015,650. Specification of Letters Patent. Patented Jan. 23, 1912.

No Drawing. Application filed September 22, 1910. Serial No. 583,321.

*To all whom it may concern:*

Be it known that I, CARL STEFFEN, a subject of the Emperor of Austria-Hungary, residing at Vienna, Austria-Hungary, have invented certain new and useful Improvements in Methods of Extraction of Sugar-Juices from Secchariferous Plants by Combined Pressing and Lixiviating Operations, of which the following is a specification.

In the art of manufacturing sugar and for the purpose of obtaining pure concentrated saccharine juices it has already been known to introduce raw beetroot juice heated to from 60 to 100° C. into secchariferous plants such as beetroot, sugar cane and the like, whereupon, by the application of a suitable pressing device, the mass is separated into the expressed pulp and the juice, which latter is thereupon submitted to the further operations generally known and used for the production of sugar. Furthermore a method has already been proposed according to which the expressed raw juice obtained by the expression of beetroot chips, slices and the like, that have been brought to a higher temperature by means of heated raw beetroot juice, is again submitted to a heating operation, whereupon this re-heated raw juice is caused to act upon fresh quantities of beetroot cuttings, prior to its being subjected to the further known treatment for the production of sugar.

The present invention refers to a method of extraction of sugar from beetroot chips or beetroots disintegrated in some other shape or from other secchariferous plants by the combined action of a pressing operation and of an operation of lixiviation.

In its essence the improved method consists of the following consecutive operations: The beetroot chips, etc., are first of all submitted to the processes of working above referred to by treating them with heated raw beetroot juice and by subsequent pressing and are thereby separated into expressed juice and expressed beetroot pulp. By these operations only a partial extraction of the saccharine substances from the treated material is effected. Thereupon the treated chips, etc., are subjected to a further operation of extraction by means of a lixiviating process. This is performed in such a manner that the expressed beetroot pulp obtained is introduced immediately after it has undergone the pressing operation and while it is still in a hot condition into diffusing apparatuses of the usually known arrangement connected together so as to form a lixiviating battery in which the pulp is submitted to a systematic lixiviation with water, as the case may be, until practically all of sugar has been extracted. The juice thus obtained by lixiviation in thereupon heated, either by itself or mixed with expressed juice, to a temperature of from 60 to 100° C. and is used to act upon fresh supplies of beetroot chips before the extraction of the same by the pressing operation, in a similar manner as it has already been proposed for the working with expressed juice. The lixiviation juice after it has thus performed its action upon the treated material, can thereupon be separated from the hot beetroot chips and the like and again heated to the temperatures above indicated, in order to be again caused to act in a similar manner as above described upon new quantities of fresh beetroot chips or other secchariferous parts of plants. This operation should be repeated over and over again until the lixiviation juice employed has reached the desired degree of density and only then this juice either by itself or mixed with expressed juice is submitted to the usual further operations commonly employed for the production of sugar.

The lixiviation juice that is obtained in the course of execution of the said improved method according to the present invention from the hot expressed beetroot pulp by a systematic lixiviation with water presents a satisfactory degree of purity even in those cases where the expressed beetroot pulp has been submitted to lixiviation until practically all of the sugar is exhausted. This degree of purity can however be notably increased by repeatedly allowing the heated lixiviation juice to act upon fresh beetroot chips, so that this juice when it has reached the suitable degree of density and is conducted to further operations for the production of sugar shows finally a very high degree of purity. It has further been found that the expressed juices from fresh beetroot chips that have been before the pressing operation treated with lixiviation juice obtained from hot expressed beetroot pulp and heated to from 60 to 100° C., are equivalent in as far as the purity of the sugar is concerned to those expressed juices which would result from the same beetroot chips if these chips were treated with raw juices obtained from fresh beetroot, instead of with the said lixiviation juice from expressed beetroot pulp.

The combined operations that form subject matter of the present invention, that is to say the hot pressing operation to which the beetroot chips heated by hot raw beetroot juices are submitted, in combination with the systematic lixiviation process to which the hot expressed beetroot pulp is submitted in the known diffusion batteries will also yield most essential advantages in relation to the production of sugar from sacchariferous plants that are to be submitted to the extracting operation. These advantages consist in that while a lesser amount of water is consumed and an increased efficiency of the diffusion battery is attained, losses of sugar in the waste products of the lixiviation process can entirely be avoided while at the same time juices of high concentration are obtained.

For a given quantity by weight of beetroot the total consumption of water in the diffusion battery will be smaller by about 40% than in the usual diffusion process, while the waste products from the lixiviation process are entirely treated and practically all of the sugar exhausted therefrom. The diffusion batteries of the kind usually employed in sugar factories give an increase of efficiency of more than 60%. By diminishing the amount of water consumed during the lixiviation process extraction juices of a purer quality and waste products more rich in non-saccharine constituents are obtained. The quantity of the waste water is essentially smaller and contains less fibrous constituents that are troublesome for the working process and this waste water can be employed without any drawbacks for the lixiviation of fresh quantities of expressed beetroot pulp so that the said combined method of extraction can afford also the possibility to avoid those difficulties that are otherwise connected with the removal of the waste water.

Claim.

The method of extracting sugar juices from sacchariferous plants, consisting in reducing the plants to small portions and subjecting such portions preliminarily to a treatment with heated raw juice and separating the juice from the pulp by pressing the pulp, then immediately subjecting the pulp while in hot condition to a lixiviating process by introducing the same into diffusing apparatus to which water is supplied and continuing this operation until practically all of sugar has been extracted from the pulp, then heating the juice obtained by lixiviation to a temperature of from 60 to 100° C., and finally using the heated juice obtained by lixiviation for treating fresh supplies of reduced sacchariferous plants.

In testimony whereof I have hereunto set my hand in presence of two subscribing witnesses.

CARL STEFFEN.

Witnesses:
JOSEF RUBRECH,
AUGUST FUGGER.